Dec. 4, 1934.　　　H. H. STAUGAARD　　　1,982,935
COLLAPSIBLE TRAILER VEHICLE
Filed Feb. 16, 1931　　　2 Sheets-Sheet 1
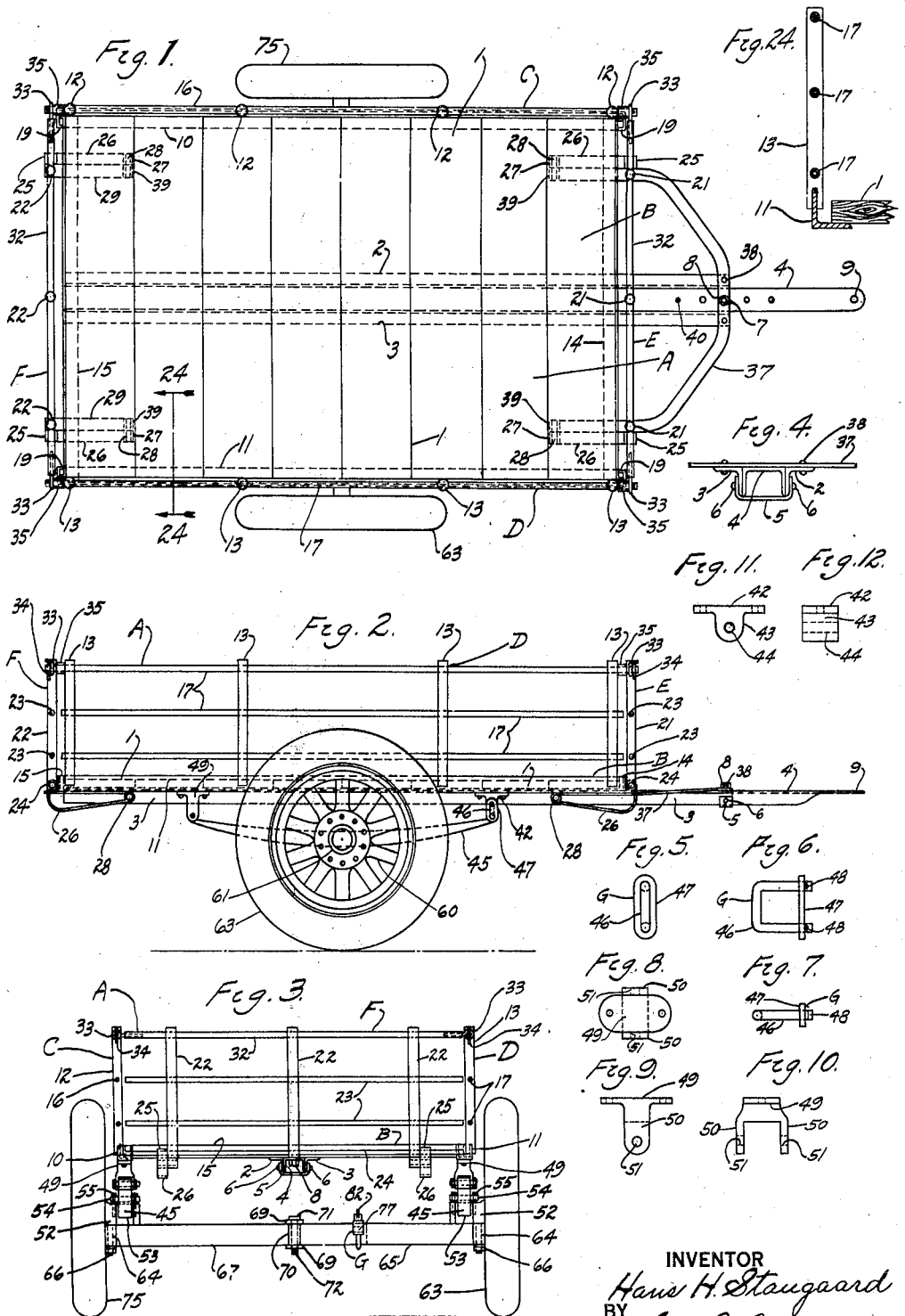
INVENTOR
Hans H. Staugaard
BY
Geo. B. Ingersoll
ATTORNEY Dec. 4, 1934.   H. H. STAUGAARD   1,982,935
COLLAPSIBLE TRAILER VEHICLE
Filed Feb. 16, 1931    2 Sheets-Sheet 2
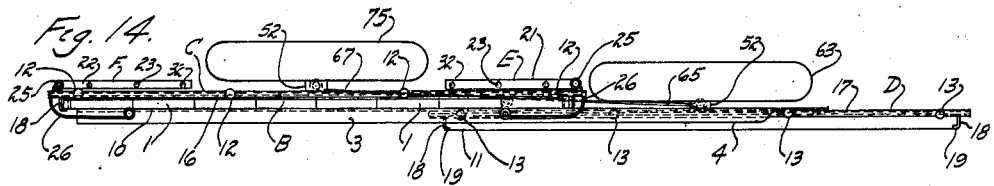
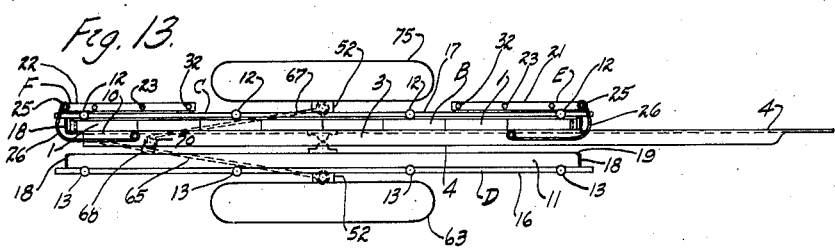
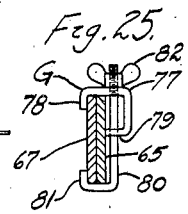
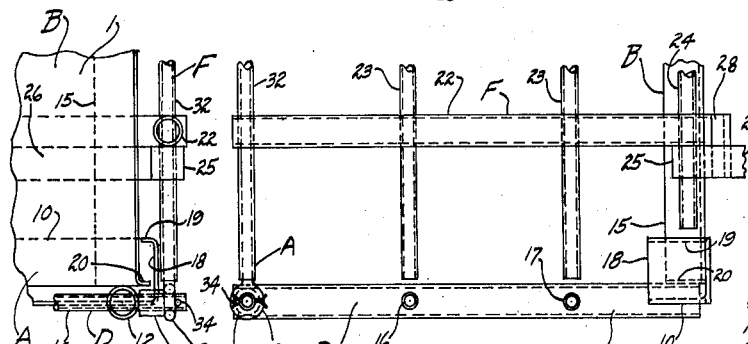
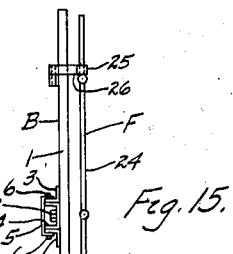
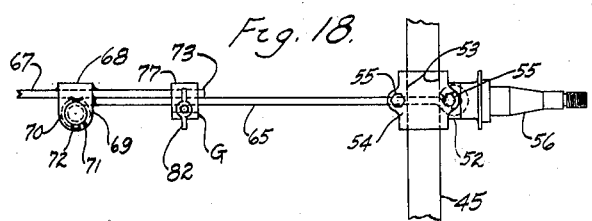
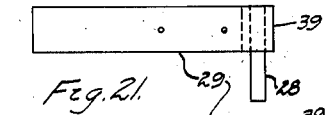
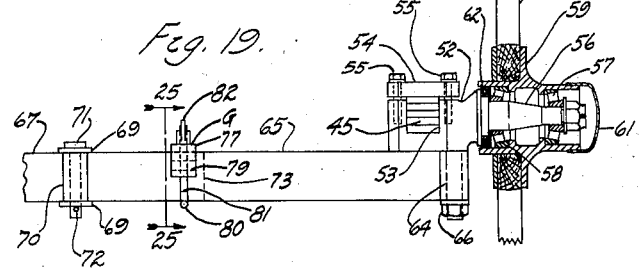
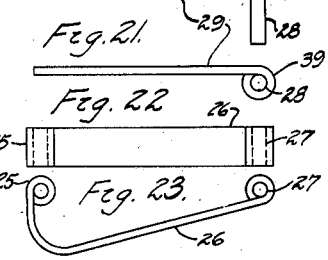
INVENTOR
Hans H. Staugaard
BY
Geo. B. Ingersoll
ATTORNEY Patented Dec. 4, 1934

1,982,935

UNITED STATES PATENT OFFICE 1,982,935

COLLAPSIBLE TRAILER VEHICLE

Hans H. Staugaard, Detroit, Mich.

Application February 16, 1931, Serial No. 516,014

15 Claims. (Cl. 280—42)

My invention relates to improvements in collapsible trailers for automative vehicles; and the objects of my improvements are, first, to provide a collapsible trailer having a folding axle member; second, to provide a collapsible trailer having a body with a non-foldable bottom; third, to provide a collapsible trailer having spring hangers fixedly attached to its body member; fourth, to provide a trailer adapted to be collapsed into a plurality of positions for storage requirements; fifth, to provide a trailer capable of being collapsed without removal of any of its component parts from the total connected assembly; sixth, to provide a trailer with end gates adapted to lock its bottom member in a folded or collapsed position; seventh, to provide a collapsible trailer having a non-collapsing bottom unit; eighth, to provide a trailer with a bottom adapted to be moved and supported uprightly from either of its sides; ninth, to provide a trailer having a draw bar adapted to be used from either end of the trailer; tenth, to provide a trailer having an adjustable tongue member attached to a removable floor; eleventh, to provide a trailer having a foldable axle member comprising resilient leaf members; and, twelfth, to provide a trailer having a yoke shackle member comprising integrally a pair of bearing portions.

I attain these objects, by the mechanism illustrated in the accompanying drawings, in which:—

Figure 1 is a plan elevation of the entire collapsible trailer vehicle; Fig. 2, a side elevation of the entire collapsible trailer vehicle; Fig. 3, an end elevation of the rear view of the entire collapsible trailer vehicle; Fig. 4, a front elevation of the tongue assembly; Fig. 5, a side elevation of a spring shackle; Fig. 6, a front elevation of a spring shackle; Fig. 7, an end elevation of a spring shackle; Fig. 8, a plan elevation of a spring bracket; Fig. 9, a side elevation of a spring bracket; Fig. 10, an end elevation of a spring bracket; Fig. 11, a side elevation of a spring shackle bracket; Fig. 12, an end elevation of a spring shackle bracket; Fig. 13, a plan elevation of the trailer vehicle in a collapsed position in which its wheels are located concentrically; Fig. 14, a plan elevation of the trailer vehicle in a collapsed position in which its wheels are located in non-concentric positions; Fig. 15, a rear end elevation of the trailer vehicle in a collapsed position in which its wheels are located concentrically; Fig. 16, a rear elevation of the left rear corner of the body portion of the collapsible trailer vehicle; Fig. 17, a plan elevation of the left rear corner of the body portion of the collapsible trailer vehicle as disclosed in Fig. 16; Fig. 18, a plan elevation of a portion of the axle together with a portion of its spring assembled thereto; Fig. 19, a side elevation of a portion of the axle together with a portion of its wheel and spring assembled thereto; Fig. 20, a plan elevation of one of the separate end gate hinge brackets; Fig. 21, a side elevation of one of the separate end gate hinge brackets; Fig. 22, a plan elevation of one of the end gate hinges; Fig. 23, a side elevation of one of the end gate hinges; Fig. 24, a partial sectional view taken on the line 24—24, Fig. 1; and Fig. 25, a sectional view of the axle members taken on the line 25—25, Fig. 19.

Similar numerals refer to similar parts throughout the several views.

The body A of my collapsible trailer vehicle comprises a floor B, side members C and D, and end members E and F. The floor D may be constructed of the boards 1 which extend transversely and are each suitably attached to the angle irons 2 and 3 so as to form a fixed unit therewith, the angle irons 2 and 3 extending longitudinally of the body A and further extending beyond the front of the body A, the angle irons 2 and 3 forming a guide for the draw bar 4. The draw bar 4 is further guided at the forward end of the angle irons 2 and 3 by the member 5 which extends across the bottom flanges of the angle irons 2 and 3 and around the edges of its vertical flanges, both ends of the member 5 being secured to the vertical flanges of the angle irons 2 and 3 by the rivets 6. The member 37 is also attached to the horizontal flanges of the angle irons 2 and 3 by the rivets 38, said member 37 also acting as a guide for the draw bar 4. The member 37 is extended to and suitably attached to the under side of the floor B and is provided with the eye portions 39. The member 37 is provided with a hole 7 which is adapted for alignment with the series of holes 40 which are located in the horizontal flange of the draw bar 4. The bolt 8 is adapted to pass through the hole 7 of the draw bar and through one of the series of holes 40, the series of holes 40 thus providing for extending the draw bar 4 beyond the forward end of the angle irons 2 and 3 to provide for positioning the trailer at the desired distance behind the vehicle to which the trailer is to be attached. The draw bar 4 is provided with a hole 9 for attaching to a tractor vehicle. The draw bar 4 may extend to the rear of the angle irons 2 and 3 in its minimum extended position beyond the forward ends of the angle irons 2 and 3.

It is to be noted that the floor B may, if desired, be constructed of a plurality or of a single metal member.

When the trailer is in its operative position, the lower surface of the boards 1 rest on the angle members 10 and 11. The side members C and D are repectively provided with the tubular members 12 and 13 which are suitably and fixedly attached to the angle members 10 and 11, the members 12 and 13 being slotted to fit over the vertical side of the angle members 12 and 13 as disclosed in detail in Fig. 24. The angle members 14 and 15 are also respectively attached to the floor B at its forward and rearward sides or ends.

The side members C and D are also respectively provided with the members 16 and 17 which extend longitudinally through the tubular members 12 and 13, the members 16 and 17 being preferably of round section.

It is to be noted that the angle members 10 and 11 are provided at their ends with an upturned flange portion 18, as disclosed in Figs. 16 and 17, the portions 18 being further provided with flange portions 19 which contact with the vertical flanges of the angle members 14 and 15. Also the angle members 14 and 15 are provided with the flange portions 20 at the ends of their vertical flanges for the purposes hereinafter disclosed.

The end members E and F are also respectively provided with the tubular members 21 and 22 through which pass the members 23 which are preferably of round section.

The lower member 24 of the end members E and F are also suitably and respectively fastened in the tubular members 21 and 22 of the end members E and F and are further contained within the eye 25 of the hinge members 26. The hinge members 26, adjacent the member 37 are further provided with the eyes 27 which pivotally engage the pins 28 which are suitably fastened in the eyes 39 of the members 37 and 29.

It is to be noted that the member 37 is securely attached to the under side of the floor B and is so located as to engage the sides of the hinge members 26, the hinge members 26 thus being located and guided by the member 37, the member 37 extending under and supporting the end member E. Similarly the separate brackets 29, at the end of the floor B from the member 37, are fastened to the under side of the floor B and support and guide the hinge members 26 and the end member F, the hinge members 26 at the rear end of the vehicle being also provided with eyes 27 engaging the pins 28 of the brackets 29. It is to be noted that the member 37 and the members 29 will thus aid in maintaining the end members E and F, together with their hinge members 26 in their transverse positions.

The upper members 32 of the end gate members E and F are provided, at their ends, with eyes 33 through which extend the upper members 16 and 17 of the side members C and D, the upper members 16 and 17 being retained therein by the pins 34, spacers 35 being interposed between the eyes 33 and the end tubular members 12 and 13 of the side members C and D, said spacers 35 thereby engaging and locating the eyes 33 in their proper upright positions.

The spring shackle brackets 42 are suitably and respectively fastened to the angle members 10 and 11 and are each provided with a boss 43 through which extends the hole 44. The springs 45 are composed of a plurality of leaves, are suitably provided with eyes at their ends, and are connected to the spring shackle brackets 42 by the spring shackles G. Each spring shackle G comprises the U shaped member 46 which is adapted to pass through the hole 44 of the spring shackle bracket 42 and one of the eyes at the end of the spring 45, together with the plate 47 which is adapted to engage the sides of the boss 43 of the spring shackle bracket 42 and the surface at one end of the eyes at the end of the springs 45, the plate being retained in position by suitable fastening members passing through the holes 48 of the U shaped member 46.

The spring brackets 49 are suitably and respectively fastened to the angle members 10 and 11 and are each provided with jaws 50 having holes 51 therethrough. The jaws 50 are adapted to engage the eyes at the ends of the spring 45, the eyes of the spring being retained between the jaws 50 by suitable fastening members passing through the holes 51 of the jaws 50 and through the eyes of the spring 45.

The brackets 52 are provided with the slots 53 into which the springs 45 fit, the springs 45 being retained therein by the clamp members 54 which, in turn, are fastened by the screws 55. The springs 45 may be further suitably restrained from longitudinal movement in the slots 53 of the brackets 52. The brackets 52 are further provided with spindle portions 56 on which are suitably mounted the bearing assemblies 57 and 58 on which, in turn, revolve the hubs 59 which support the wheels 60 as disclosed in detail in Fig. 19. The hubs 59 are provided with hub caps 61 and with suitable dust felts 62. The wheels 60 are suitably provided with rim means for supporting the tires 63 and 75. The brackets 52 are further provided with the studs 64 on which are pivotally mounted the outer ends of the axle members 65 and 67, the axle members being retained on the studs 64 by the nuts 66.

It is to be noted that the axle members 65 and 67 are constructed of flat spring or resilient steel members similar to the leaves of the spring 45, the axle members 65 and 67 being assembled with their flat sides extending in vertical planes to provide the maximum ability for supporting the load of the trailer vehicle.

The axle member 67 is provided with the bracket 68 which may be welded or otherwise suitably fastened to the axle member 67. The bracket 68 is provided with jaws 69 which engage and pivotally support the eye portion 70 at the inner end of the axle member 65, the eye portion 70 being pivotally retained between the jaws 69 by the pin 71 and the pin 72.

The bracket 68 is located at approximately the center of the trailer between the tires 63 and 75 and the axle member 67 has its inner end 73 extended beyond the bracket 68 so that the inner end 73 may be maintained parallel with and adjacent the axle member 65 when the trailer vehicle assembly is in its non-collapsed or load carrying position, the inner end 73 of the axle member 67 being maintained in its fixed position adjacent the axle member 65 by the clamp assembly G. The clamp assembly G comprises the clamp member 77 which fits over the upper edges of the axle members 65 and 67, the clamp member 77 being provided with the shouldered portion 78, which engages the axle member 67, and the portion 79 which engages the axle member 65. The hook member 80 engages the lower edges of the axle members 65 and 67 and is provided with a shouldered portion 81 for engaging the axle member 81. The hook member 80 passes through the portion 79 and the upper part of the clamp member 77 and is provided with a threaded end which engages the wing nut 82. As the wing nut 82 is tightened on the hook member 80, the upper portion of the clamp member 77 together with the lower portion of the hook member 80 will be forced into engagement with the axle members 65 and 67 and the portion 79 of the clamp member 77 will be forced into engagement with the vertical face of the axle member 65, thus further forcing the axle members 65 and 67 together.

When it is desired to fold or collapse the trailer, the wing nut 82 may be loosened and the clamp assembly G slidably moved off the inner end 73 of the axle member 67 when the axle members 65 and 67 may be pivotally moved and folded about the pin 71.

When it is desired to collapse or fold the trailer assembly, the floor A may be swung upwardly to an upright position, either to the right or left side, Fig. 15 disclosing said floor A as being swung upwardly to the right side.

It is to be noted that the floor A may be swung upwardly from either side, the angle members 14 and 15 of the floor A being supported on the angle members 10 and 11 during the swinging movement, the angle members 14 and 15 tending to pivotally move on the angle members 10 and 11 until the floor A is in an upright position, as disclosed in Figs. 13, 14, and 15, with the outer end surfaces of the boards 1 and the flange 20 resting on the upper horizontal surface of one of the angle members 10 and 11. It is to be noted that there is no direct pivotal connection between the angle members 14 and 15 and the angle members 10 and 11, the ends of the boards 1 and the angle members 14 and 15 merely contactually sliding on the upper horizontal surface of the angle members 10 and 11 during the swinging movement.

When the floor A has been swung upwardly as above described, the floor B will occupy a vertical position adjacent either one of the side members C and D, the side members C and D always remaining in an upright position on vertical flanges of the angle members 10 and 11. During the swinging movement of the floor B, the end members E and F move with the floor B, the end members E and F always remaining pivotally attached to the floor B. When the floor B has been moved to its upright position adjacent one of the side members C or D, the end members E and F are pivotally moved to a position adjacent the outer surface of the side member selected, as in Figs. 13, 14, and 15, where the side member C is disclosed as being between the floor B and the end member F.

It is to be noted that when the end member F is pivotally moved to its position, as disclosed in Figs. 13, 14, and 15, the floor B together with its end members E and F will be supported in an upright position due to the side member D being held between the end members E and F and the floor B. This is accomplished by moving the hinge members 26 upward until the hinge members 26 extend parallel with the bottom surface of the boards 1 of the floor B, the end members E and F then being raised sufficiently to allow said end members E and F to be pivotally moved inwardly adjacent the side members C and D.

After the floor B and end members E and F have been folded as in Figs. 13, 14, and 15, the wing nut 82 may be loosened, the clamp assembly G slidably moved beyond the end 73 of the axle member 67, and the axle members 67 and 65 moved towards each other to approximately the positions disclosed in Figs. 13 and 15, the tire 63 and its wheel parts moving towards the tire 75, the wheels 60 and their tires 63 and 75 being concentrically aligned in their folded or collapsed positions.

If it is desired to fold the trailer vehicle into a still narrower transverse space, the axle member 67 may be moved to an extended position from the axle member 65 which will move the wheels 60 with its tire 63 to a position behind the wheel 75, as disclosed in Fig. 14.

It is to be noted that the floor B, together with its end members E and F and its draw bar mechanism, may be totally removed from off the angles 14 and 15 and replaced with its draw bar mechanism extending from the opposite end of the trailer vehicle. This will prove a decided advantage when the trailer is constructed with its wheels and axle mechanism toward one end of the trailer instead of on the center of the trailer as shown in Figs. 1 and 2. Due to load conditions in which the overhang of the load beyond the trailer body may vary, it may be desired to distribute the load to different advantage which may be accomplished by changing the relative position of the wheels and axle and the front end of the trailer body, this being accomplished by changing the floor B end for end on its supports as above described.

I claim:

1. In a trailer vehicle, the combination of a floor assembly comprising floor members, a pair of angle irons extending transversely to the floor members of said floor assembly, said angle irons being suitably attached to said floor members, approximately at their central portions, body side assemblies comprising angle irons at their base for loosely supporting said floor assembly, the angle irons of said body side assemblies being provided at each of their ends with a U section extending at right angles therewith, angle irons secured at each end of said floor assembly, each of said last mentioned angle irons being provided with a flange portion extending between the U section at the ends of the angle irons of said floor assembly for guiding said floor assembly when moved from its position on the angle irons of said body side assemblies, and body end assemblies hinged on said floor assembly and suitably connected with said body side sections.

2. In a trailer vehicle, the combination of a pair of body side members, each provided with a horizontal flange at its base, the ends of said horizontal flange having an upturned U shaped portion and a floor assembly supported on the horizontal flanges of said body side members, said floor assembly being provided with angular members at each of its ends, each of the angular members of said floor assembly having a flange extending at right angles to the face of said floor assembly together with a flange extending between the upturned U shaped portion of said body side members.

3. In a trailer vehicle, the combination of a pair of body side members, each provided with an inwardly extending horizontal flange provided with channel portions at each of their ends, and a floor assembly provided with members having an outwardly extending flange, at each of its ends, for engaging the channel portions of the horizontal flanges of said body side members to permit said floor assembly to be guided to an upright supported position on either of said body side members.

4. In a trailer vehicle, the combination of body side members, angle irons having portions extending horizontally from said body side members, each of said angle irons having upturned channel portions at each of their ends, and a floor assembly resting on the horizontal portions of the angle irons of said body side members and provided with vertically extending flange members, said floor assembly being located longitudinally in the trailer vehicle by the vertically extending flanges of said floor assembly engaging the upturned portions of said angle irons.

5. In a trailer vehicle, the combination of a pair of side members each provided with channel shaped retaining members at their ends, a floor normally supported in a horizontal position on said side members, said floor being maintained, when in a horizontal position, against longitudinal movement by the edge surfaces of the opposite sides of the channel portions of said channel shaped retaining members, said floor being adapted to be moved through and moved radially with its corner portions moving between the open sides of the channel portion of said channel shaped retaining members on either of said pair of side members to a folded position adjacent the other of said side members, said floor being maintained, when in its folded position, against longitudinal movement by the surfaces of the closed sides of the channel portions of said channel shaped retaining members, end members, and means for folding said end members adjacent one of said side members.

6. In a trailer vehicle, the combination of body side members, a floor member supported on said body side member, and means for connecting said floor member to both of said body side members, said means permitting said floor member to be optionally folded to an upright position adjacent either of said body side members, said means comprising vertically extending channel members on said body side members for receiving extensions of said floor member within the open sides of the channel members with sufficient clearance to permit said floor member to be moved with a radial movement from a horizontal position to an upright position.

7. In a foldable vehicle, the combination of a pair of body side members, angle irons suitably attached to each of said body side members, said angle irons each being provided with horizontal flanges having a channel section at each of its ends, a floor member supported on the horizontal flanges of said angle irons, and angle irons suitably attached to opposite sides of said floor member, each of said last mentioned angle irons being provided with outwardly extending flange portions extending between the sides of the channel sections of the horizontal flanges of the angle irons of said body side members, said outwardly extending flange portions being adapted for movement between the sides of said channel sections to permit said floor member to be folded adjacent either of said body side members.

8. In a folding vehicle, the combination of a pair of body side members each provided with an angle iron member at its base, said angle iron members each being provided with a horizontally extending flange having upturned and inwardly extending channel sections at its ends, a floor assembly provided with angle iron members at two of its sides, each of said angle iron members being provided with outwardly extending flanges located between the upturned and inwardly extending channel sections of the horizontally extending flanges of the angle iron members of said body side members, brackets suitably attached to the horizontally extending flanges of the angle iron members of said body side members, a vehicle chassis suitably connected to said brackets, and a pair of body side members pivotally connected with said floor assembly.

9. In a folding vehicle, the combination of a pair of body members suitably supported in permanent upright positions, each of said body members being provided with oppositely disposed and inwardly facing channel sections, and a floor assembly supported in a horizontally extending position on said body members when the vehicle is in an unfolded position, said floor assembly being supported on its edge in a vertically extending position adjacent one of said body members when the vehicle is in a folded position, said floor assembly being provided with projecting members extending between the channel sections of said body members when the vehicle is in folded and unfolded positions.

10. In a vehicle, the combination of a pair of body side members fixedly supported in upright positions, each of said body side members being provided with upright members together with members extending transversely through said upright members, the uppermost of said transversely extending members extending outwardly from said upright members for a greater distance than the remainder of said transversely extending members, a floor assembly supported on said body side members, a second pair of body side members pivotally supported on said floor assembly, said second pair of body side members being provided with eye portions for fitting around the ends of the uppermost transversely extending members of said first mentioned pair of body side members, means for securing said eye portions to the uppermost transversely extending members of said first mentioned pair of body side members, and means for spacing said eye portions from the upright members at the ends of said first mentioned pair of body side members.

11. In a trailer vehicle, the combination of body side members, angle members suitably supported at the bottom of said body side members, each of said angle members being provided with a horizontal flange connected with a vertical flange located at its outer side, the ends of the horizontal flange being each provided with an upturned portion, said upturned portions being each provided with a relatively short flange extending vertically, at the inner side of said upturned portion, and parallel with said first mentioned vertical flange located at the outer side of each of said angle members, means for spacing said body side members, and a floor assembly supported on the horizontal flanges of said angle members, said floor assembly being secured together to extend in a single plane, said floor assembly being provided with flanges extending between and adapted to engage said first mentioned vertical flanges of said angle members, said last mentioned flanges of said floor assembly being further adapted to engage said relatively short flange of said upturned portions of said angle members.

12. In a trailer vehicle, the combination of a floor, a bracket member suitably secured to the under side of said floor, said bracket member being fixedly mounted relative to said floor, said bracket member having its outer end extending in a fixed position beyond the edge of said floor, said bracket member being provided with a pivot portion adjacent its inner end and extending transversely relative to said bracket member, a hinge member pivotally mounted on said pivot portion of said bracket member, and a body member pivotally connected to the outer end of said hinge member, said body member being supported on the outer end of said bracket member, extending in a fixed position beyond the edge of said floor when said body member is in its assembled position relative to the floor of the trailer vehicle.

13. In a trailer vehicle, the combination of a pair of upright body side members each provided with an angle member having an upturned channel portion at each of its ends, said upturned portions having the open side of their channels oppositely disposed at the ends of said angle member, and a floor assembly provided with flange portions extending in a vertical plane at the corners thereof, said flange portions extending between the sides of the channels of the upturned portions of said angle members, said floor assembly being thereby adapted to be optionally folded in a vertical plane adjacent either of said pair of upright body side members, said flange portions of said floor assembly operatively moving between the sides of the channels of the upturned portions of said angle members.

14. In a trailer vehicle, the combination of a plurality of floor members, a pair of angle members extending transversely to said floor members, said angle members being secured to said floor members at their central portions, side body members each provided with a flange at their base for loosely supporting said floor members, a pair of angle members secured to said floor members and connecting the ends of each of the first mentioned angle members, and end body members pivotally mounted on said floor members.

15. In a foldable trailer, the combination of a body side member provided with an angle iron at its base, said angle iron being provided with an upturned channel section at each of its ends, and a floor assembly provided with angle irons at its ends, each of said angle irons of said floor assembly being provided with flanges at one of its ends, said flanges of the angle irons of said floor assembly extending substantially in a common plane, said floor assembly being adapted to be supported in an upright position adjacent said body side member and within the upturned channel sections at each end of the angle iron of said body side member, said flanges of said angle irons at the ends of said floor assembly resting on said angle irons of said body side member at points located within the upturned channel sections at each end of the angle iron of said body side member.

HANS H. STAUGAARD.